United States Patent
Ricciuti et al.

(10) Patent No.: US 9,741,512 B2
(45) Date of Patent: Aug. 22, 2017

(54) SWITCHGEAR SYSTEM, AND ELECTRICAL SWITCHING APPARATUS ASSEMBLY AND MAINTAINING METHOD THEREFOR

(71) Applicant: EATON CORPORATION, Cleveland, OH (US)

(72) Inventors: Anthony Thomas Ricciuti, Bethel Park, PA (US); Daniel Garett Sims, Newberry, SC (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/970,594

(22) Filed: Dec. 16, 2015

(65) Prior Publication Data
US 2017/0178843 A1 Jun. 22, 2017

(51) Int. Cl.
*H01H 33/04* (2006.01)
*H01H 71/10* (2006.01)

(52) U.S. Cl.
CPC ............ *H01H 33/04* (2013.01); *H01H 71/10* (2013.01); *H01H 2235/01* (2013.01)

(58) Field of Classification Search
CPC ............ H01H 2235/01; H01H 71/522; H01H 2205/002; H01H 33/42; H01H 3/3015; H01H 3/46; H01H 9/02; H01H 13/14; H01H 2033/907; H01H 31/003; H01H 33/08; H01H 33/12; H01H 33/52; H01H 33/6661; H01H 3/03
See application file for complete search history.

(56) References Cited

U.S. PATENT DOCUMENTS

| | | | | |
|---|---|---|---|---|
| 3,823,281 A * | 7/1974 | Wilson | ................. | H02B 11/133 200/50.21 |
| 4,007,346 A * | 2/1977 | Gaigg | ................. | H02B 13/065 218/24 |
| 4,587,390 A * | 5/1986 | Gray | .................... | H01H 33/666 200/400 |
| 7,053,327 B2 | 5/2006 | Benke et al. | | |
| 7,075,027 B1 | 7/2006 | Fogle et al. | | |
| 7,186,937 B1 | 3/2007 | Ricciuti et al. | | |
| 7,435,920 B1 * | 10/2008 | Yoo | ...................... | H01H 3/3021 200/50.32 |

(Continued)

*Primary Examiner* — Truc Nguyen
(74) *Attorney, Agent, or Firm* — Eckert Seamans; John Powers; Grant Coffield

(57) ABSTRACT

An electrical switching apparatus assembly is for a switchgear system. The switchgear system includes a number of circuit stabs and an enclosure having a number of compartments. The electrical switching apparatus assembly includes an electrical switching apparatus having a number of terminals and a mounting assembly, the terminals being structured to be mechanically coupled and electrically connected to the circuit stabs, the mounting assembly comprising a mounting member coupled to the terminals; and a maintaining assembly comprising a plate member and a maintaining member, the plate member being coupled to the mounting member, the maintaining member being coupled to the plate member and structured to engage the enclosure. Responsive to an arc fault event, the maintaining assembly is structured to move between FIRST and SECOND positions. When the maintaining assembly moves from the FIRST position to the SECOND position, the plate member moves away from the terminals.

20 Claims, 3 Drawing Sheets

(56) References Cited

U.S. PATENT DOCUMENTS

| | | |
|---|---|---|
| 7,557,682 B2 | 7/2009 | Ricciuti et al. |
| 7,586,738 B1 | 9/2009 | Hartzel et al. |
| 8,519,290 B2 | 8/2013 | Ricciuti et al. |
| 2003/0184945 A1* | 10/2003 | Trivette ............... H01H 33/666 361/139 |
| 2006/0086694 A1* | 4/2006 | Benke .................. H01H 33/666 218/154 |
| 2014/0320242 A1* | 10/2014 | Lanning ............. H01H 71/0214 335/167 |
| 2016/0099552 A1* | 4/2016 | Sims ....................... E05B 65/46 361/609 |
| 2016/0141136 A1* | 5/2016 | Ashtekar ................ H01H 71/10 200/50.01 |
| 2017/0018381 A1* | 1/2017 | Abrahamsen ........ H01H 33/666 |

\* cited by examiner

SWITCHGEAR SYSTEM, AND ELECTRICAL SWITCHING APPARATUS ASSEMBLY AND MAINTAINING METHOD THEREFOR

BACKGROUND

Field

The disclosed concept pertains generally to switchgear systems. The disclosed concept further pertains to electrical switching apparatus assemblies for switchgear systems such as, for example, electrical switching apparatus assemblies including circuit breakers. The disclosed concept further pertains to methods of maintaining electrical switching apparatus assemblies within switchgear systems.

Background Information

Electrical switching apparatus used in power distribution systems are often mounted within a switchgear enclosure either individually or in combination with other switchgear (e.g., without limitation, circuit switching devices and circuit interrupters such as circuit breakers, contactors, motor starters, motor controllers and other load controllers). Some electrical switching apparatus such as, for example, some medium-voltage and low-voltage circuit breakers, can be relatively large. In order to facilitate movement (e.g., installation; removal; maintenance), some circuit breakers are commonly coupled to draw-out mechanisms which permit such circuit breakers to be drawn out of a corresponding compartment or cell of the switchgear enclosure. Accordingly, such circuit breakers are commonly known in the art as "draw-out" circuit breakers.

Arc fault events in switchgear systems, which can result from a number of causes, such as, for example, bad or worn material, voltage spikes, and/or entry into the switchgear system by an animal (e.g., a rodent), produce high energy gases, which pose a threat to the structure and nearby personnel. During an arc fault event inside of the switchgear system, the electrical arc generates a spike in the heat and pressure within the switchgear compartment. The amount of pressure generated during the arc fault is directly related to the length of the arc. Maintaining the position of the circuit breaker with respect to the circuit bus stabs of the switchgear system is key to minimizing the length of the electrical arc. Furthermore, if the pressure from the electrical arc pushes the circuit breaker off of the circuit stabs, additional arcing develops, further increasing the pressure within the switchgear system and resulting in more potentially hazardous damage. This increased pressure creates a potential for the circuit breaker to be undesirably ejected from the switchgear enclosure compartment.

There is, therefore, room for improvement in switchgear systems and in electrical switching apparatus assemblies therefor.

There is also room for improvement in methods of maintaining electrical switching apparatus assemblies in switchgear systems.

SUMMARY

These needs and others are met by embodiments of the disclosed concept, which are directed to a switchgear system, and electrical switching apparatus assembly and maintaining method therefor, in which a maintaining assembly moves between positions in response to an arc fault event in order to maintain the electrical switching apparatus assembly within a compartment of the switchgear system.

In accordance with one aspect of the disclosed concept, an electrical switching apparatus assembly for a switchgear system is provided. The switchgear system includes a number of circuit stabs and an enclosure having a number of compartments. The electrical switching apparatus assembly comprises: an electrical switching apparatus comprising a number of terminals and a mounting assembly, each of the number of terminals being structured to be mechanically coupled and electrically connected to a corresponding one of the circuit stabs, the mounting assembly comprising a mounting member coupled to the number of terminals; and a maintaining assembly comprising a plate member and a maintaining member, the plate member being coupled to the mounting member, the maintaining member being coupled to the plate member and structured to engage the enclosure. Responsive to an arc fault event, the maintaining assembly is structured to move between a FIRST position and a SECOND position. When the maintaining assembly moves from the FIRST position toward the SECOND position, the plate member moves away from the number of terminals in order to maintain the electrical switching apparatus assembly within one of the number of compartments.

In accordance with another aspect of the disclosed concept, a switchgear system comprises: a number of circuit stabs; an enclosure having a number of compartments; and an electrical switching apparatus assembly comprising: an electrical switching apparatus comprising a number of terminals and a mounting assembly, each of the number of terminals being mechanically coupled and electrically connected to a corresponding one of the circuit stabs, the mounting assembly comprising a mounting member coupled to the number of terminals, and a maintaining assembly comprising a plate member and a maintaining member, the plate member being coupled to the mounting member, the maintaining member being coupled to the plate member and structured to engage the enclosure. Responsive to an arc fault event, the maintaining assembly is structured to move between a FIRST position and a SECOND position. When the maintaining assembly moves from the FIRST position toward the SECOND position, the plate member moves away from the number of terminals in order to maintain the electrical switching apparatus assembly within one of the number of compartments.

In accordance with another aspect of the disclosed concept, a method of maintaining an electrical switching apparatus assembly within a switchgear system is provided. The switchgear system includes a number of circuit stabs and an enclosure having a number of compartments. The electrical switching apparatus assembly includes an electrical switching apparatus and a maintaining assembly. The electrical switching apparatus has a number of terminals and a mounting assembly. The mounting assembly includes a mounting member coupled to the number of terminals. The maintaining assembly has a plate member and a maintaining member. The plate member is coupled to the mounting member. The maintaining member is coupled to the plate member. The method comprises the steps of: mechanically coupling and electrically connecting each of the terminals with a corresponding one of the circuit stabs; and responsive to an arc fault event, moving the plate member away from the number of terminals in order to maintain the electrical switching apparatus assembly within one of the one of the number of compartments.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

Figure 1:
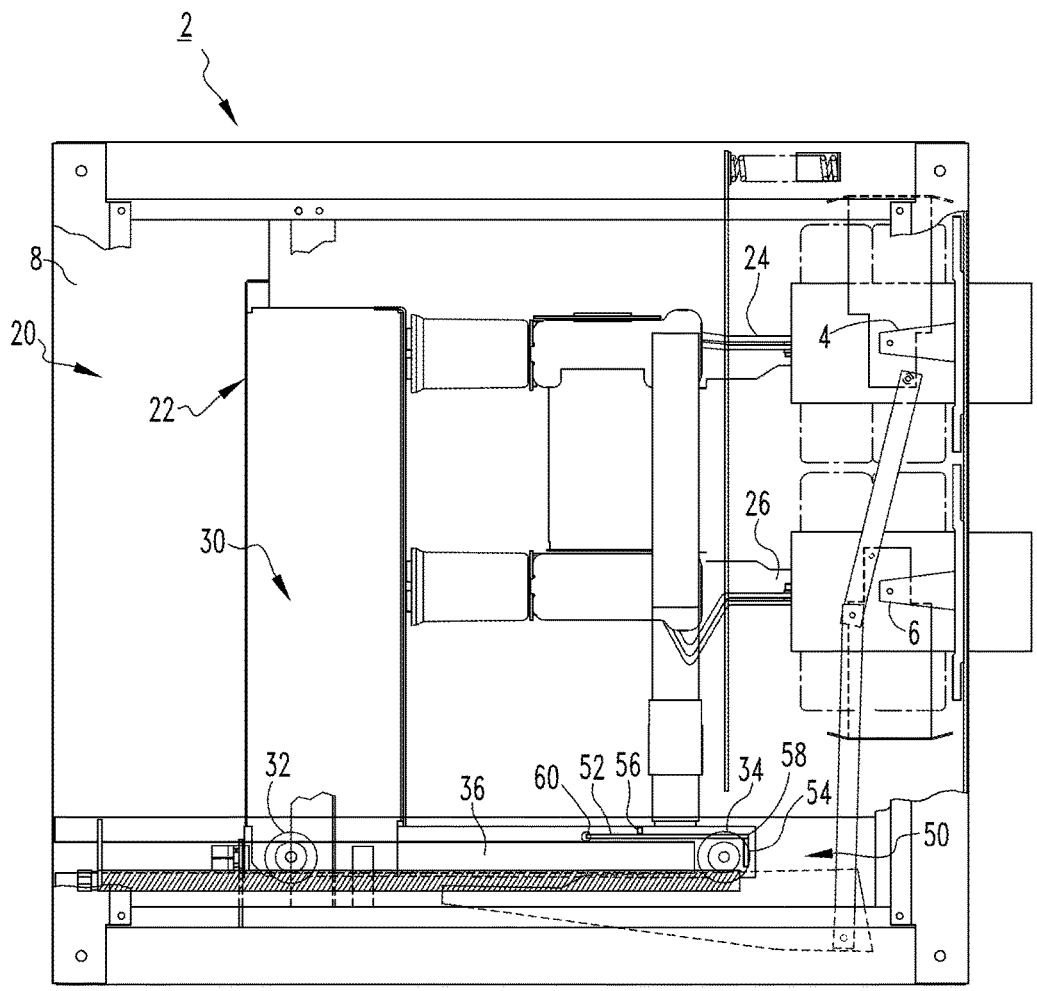
FIG. 1 is a side elevation view of a switchgear system and electrical switching apparatus assembly therefor, shown with a maintaining assembly in a FIRST position, in accordance with a non-limiting embodiment of the disclosed concept.
Figure 2:
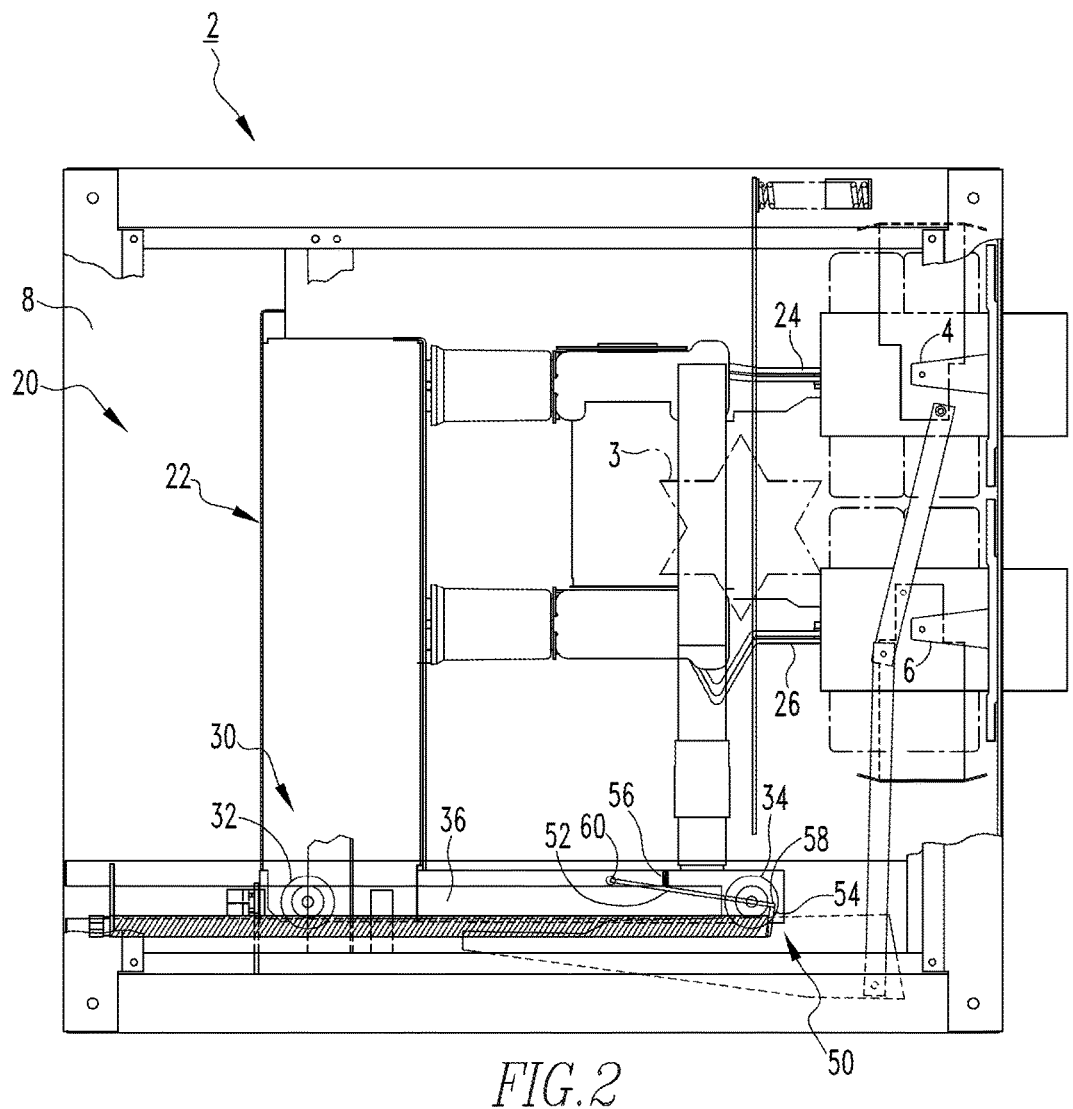
FIG. 2 is a side elevation view of the switchgear system and electrical switching apparatus assembly therefor of FIG. 1, shown with the maintaining assembly in a SECOND position.

FIGS. 1 and 2 show a portion of a switchgear system 2 for use in a power distribution system (not shown). The example switchgear system 2 has a number of circuit stabs 4,6, an enclosure having a number of compartments (only one compartment 8 is shown in the example of FIGS. 1 and 2), and an electrical switching apparatus assembly 20 located within the compartment 8. In accordance with embodiments of the disclosed concept, the electrical switching apparatus assembly 20 is structured to be reliably maintained in the compartment 8 during an arc fault event, distinct from many known switchgear systems (not shown) in which electrical switching apparatus are often dangerously ejected during arc fault events.

The electrical switching apparatus assembly 20 includes an electrical switching apparatus (e.g., without limitation, medium voltage vacuum circuit breaker 22) and a maintaining assembly 50. The circuit breaker 22 has a number of terminals 24,26 and a mounting assembly 30. The terminals 24,26 are each structured to be mechanically coupled and electrically connected to a corresponding one of the circuit stabs 4,6. As will be discussed in greater detail hereinbelow, the maintaining assembly 50 advantageously operates to maintain the electrical switching apparatus assembly 20 within the compartment 8, and in particular, to maintain the connection between the circuit stabs 4,6 and the terminals 24,26, in response to an arc fault event. Thus, the potential for undesirable additional increases in pressure within the switchgear system 2 in the event of such an arc fault event due to separation of the circuit stabs 4,6 from the terminals 24,26 is significantly minimized. In this manner, the maintaining assembly 50 ensures that the electrical switching apparatus assembly 20 will not be undesirably ejected from the compartment 8 during such an arc fault event, thereby significantly improving safety to any nearby personnel.

In order to maintain the electrical switching apparatus assembly 20 in the compartment 8, the maintaining assembly 50 advantageously relies on the pressure generated from the arc fault event. FIG. 2 depicts a rendering of an arc fault event at a location 3 (shown in simplified form in phantom line drawing) within the compartment 8. Because the arc fault event generates a pressure wave expanding in all directions, significant energies will be directed from the location 3 directly toward the maintaining assembly 50. Accordingly, the maintaining assembly 50 relies on the pressure generated by the arc fault event to move between a FIRST position (shown in FIG. 1) and a SECOND position (shown in FIG. 2) in response to the arc fault event.

The maintaining assembly 50 includes a plate member 52, a maintaining member (e.g., without limitation, pin 54) coupled to and being perpendicular to the plate member 52, and a biasing element (e.g., without limitation, spring 56). The mounting assembly 30 includes a pair of wheels 32,34 and a mounting member (e.g., without limitation, wheel rail 36 extending between and being coupled to the wheels 32,34) each coupled to the terminals 24,26. The wheels 32,34 and the wheel rail 36 are pre-existing structures on the circuit breaker 22 that advantageously allow the circuit breaker 22 to be racked in and out of the compartment 8. The plate member 52 includes a first end portion 58 that is coupled to the pin 54, and a second, opposite and distal end portion 60 that is pivotably coupled to the wheel rail 36. It will be understood, however, that the second end portion 60 may be pivotably coupled to any suitable alternative component, without departing from the scope of the disclosed concept. The plate member 52 and the pin 54 are thus structured to pivot together about the second end portion 60, thereby allowing the maintaining assembly 50 to move between the FIRST position (FIG. 1) and the SECOND position (FIG. 2). The spring 56 is coupled to the plate member 52 between the end portions 58,60 and biases the plate member 52 toward the FIRST position (FIG. 1).

When the maintaining assembly 50 moves from the FIRST position toward the SECOND position (i.e., in response to pressure being exerted on the plate member 52 by the arcing energies), the plate member 52 moves away from the terminals 24,26 in order to maintain the electrical switching apparatus assembly 20 within the compartment 8. As shown in FIG. 2, in which the arc fault event has caused the maintaining assembly 50 to move to the SECOND position, the plate member 52 and the pin 54 have pivoted about (i.e., with respect to) the second end portion 60. In accordance with the disclosed concept, the compartment 8 includes a blocking component 10 (shown in simplified form in FIG. 3) that has an edge portion 12 defining a thru hole. When the maintaining assembly 50 is driven to the SECOND position (FIG. 2), the pin 54 engages the edge portion 12 in order to maintain the electrical switching apparatus assembly 20 in the compartment 8.

Figure 3:
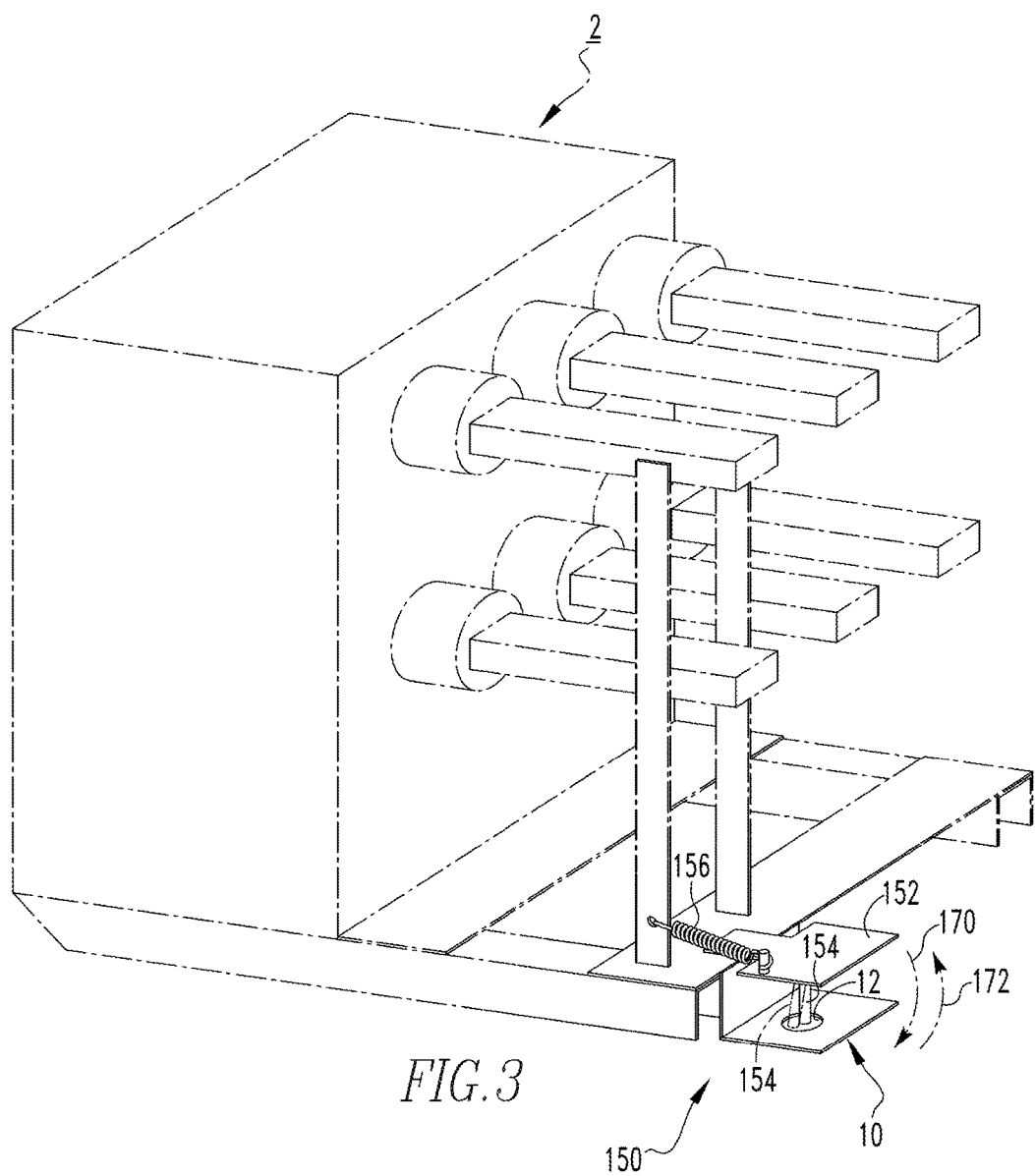
FIG. 3 is a simplified front isometric view of a portion of a switchgear system and electrical switching apparatus assembly therefor, in accordance with another non-limiting embodiment of the disclosed concept.

FIG. 3 shows a simplified view of the switchgear system 2, employed with an alternative maintaining assembly 150 instead of the maintaining assembly 50, in accordance with another non-limiting embodiment of the disclosed concept. The example maintaining assembly 150 includes a plate member 152, a maintaining member (e.g., without limitation, pin 154), and a biasing element (e.g., without limitation, spring 156) that function similar to the maintaining assembly 50 (i.e., each moves between FIRST and SECOND positions in response to an arc fault event). The pin 154 is shown in solid line drawing in the FIRST position (i.e., prior to an arc fault event) and does not extend into the thru hole in the FIRST position. The pin 154 is shown in phantom line drawing in the SECOND position (i.e., after having been driven by the arc fault event) extending through the thru hole and engaging the edge portion 12. For ease of illustration and economy of disclosure, only the pin 154 is shown in phantom line drawing in FIG. 3 in the SECOND position, although it will be appreciated that the plate member 152 and the spring 156 likewise move to the SECOND position in response to the arc fault event in a similar manner as the maintaining assembly 50 (see, for example, the plate member 52 and the spring 56 in FIG. 2, shown in the SECOND position).

Accordingly, the arc fault event causes the pin 154 to rotate in a direction 170, and when the pressure exerted on the plate member 152 by the arcing energies subsides, the stored energy of the spring 156 can be released to cause the pin 154 to rotate in a direction 172 opposite the direction 170 and return to the FIRST position. Thus, arcing energies cause the maintaining assemblies 50,150 to move from the FIRST position to the SECOND position, and the respective springs 56,156 cause the maintaining assemblies 50,150 to move from the SECOND position to the FIRST position. When the maintaining assembly 150 is in the SECOND position, the pin 154 engages the edge portion 12 in order to maintain the electrical switching apparatus assembly 20 in the compartment 8.

More specifically, the movement of the respective pins 54,154 with respect to the blocking component 10, and the eventual engagement between the respective pins 54,154 and the edge portion 12 when the maintaining assemblies 50,150 are in the SECOND position advantageously prevents the electrical switching apparatus assembly 20 from moving with respect to the compartment 8. That is, arcing energies attempting to drive the electrical switching apparatus assembly 20 off of the circuit stabs 4,6 and to the left (with respect to the orientation of FIGS. 1 and 2) will result in the pin 54 first pivoting, and then engaging and exerting a force on the edge portion 12. The corresponding opposing normal force exerted by the edge portion 12 on the pin 54 to the right (with respect to the orientation of FIGS. 1 and 2) will resist the attempted movement of the electrical switching apparatus assembly 20 to the left and thereby cause the electrical switching apparatus assembly 20 to be maintained in the compartment 8. As a result, safety is significantly improved, as the possibility that dangerous arc fault events will cause the electrical switching apparatus assembly 20 to be ejected is significantly reduced.

It will be appreciated that a method of maintaining the electrical switching apparatus assembly 20 within the switchgear system 2 includes the steps of mechanically coupling and electrically connecting each of the terminals 24,26 with a corresponding one of the circuit stabs 4,6; and responsive to an arc fault event, moving the respective plate members 52,152 away from the terminals 24,26 in order to maintain the electrical switching apparatus assembly 20 within the compartment 8. Responsive to an arc fault event, the method further includes the step of moving the respective pins 54,154 with respect to the blocking component 10; mechanically engaging the respective pins 54,154 with the blocking component 10 in order to maintain the electrical switching apparatus assembly 20 within the compartment 8; and mechanically engaging the respective pins 54,154 with the edge portion 12 in order to maintain the electrical switching apparatus assembly 20 within the compartment 8. Finally, responsive to the arc fault event, the method includes the step of moving the respective pins 54,154 from a FIRST position corresponding to the respective pins 54,154 not extending into the thru hole to a SECOND position corresponding to the respective pins 54,154 extending through the thru hole.

Although the disclosed concept has been described herein in association with the blocking component 10 being employed to engage one of the respective pins 54,154 in order to maintain the respective maintaining assemblies 50,150 in the SECOND position, it will be appreciated that any suitable alternative component of the compartment 8 may be employed as a blocking component in order to maintain the maintaining assemblies 50,150 in the SECOND position. Furthermore, although the disclosed concept has been described herein in association with the maintaining assemblies 50,150, it will be appreciated that a similar suitable alternative maintaining assembly (not shown) may be employed in order to perform the desired function of moving between FIRST and SECOND positions in response to an arc fault event in order to maintain an electrical switching apparatus assembly within the compartment 8, without departing from the scope of the disclosed concept. That is, any number, combination, and/or configuration of plate members, pins, and/or springs may be employed in order to perform the desired function of moving between FIRST and SECOND positions responsive to an arc fault event.

Accordingly, it will be appreciated that the disclosed concept provides for an improved (e.g., without limitation, safer, better maintained) switchgear system 2 and electrical switching apparatus assembly 20 and maintaining method therefor in which, responsive to an arc fault event, a maintaining assembly 50,150 advantageously relies on the arcing energies generated to maintain the electrical switching apparatus assembly 20 in a compartment 8 of the switchgear system 2.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical switching apparatus assembly for a switchgear system comprising a number of circuit stabs and an enclosure having a number of compartments, said electrical switching apparatus assembly comprising:
   an electrical switching apparatus comprising a number of terminals and a mounting assembly, each of said number of terminals being structured to be mechanically coupled and electrically connected to a corresponding one of said circuit stabs, said mounting assembly comprising a mounting member; and
   a maintaining assembly comprising a plate member and a maintaining member, said plate member being coupled to said mounting member, said maintaining member being coupled to said plate member,
   wherein, responsive to an arc fault event, said maintaining assembly is structured to move between a FIRST position and a SECOND position, and
   wherein, when said maintaining assembly moves from the FIRST position toward the SECOND position, said maintaining member moves into engagement with one of said number of compartments in order to maintain said electrical switching apparatus assembly within said one of said number of compartments.

2. The electrical switching apparatus assembly of claim 1 wherein said maintaining assembly further comprises a biasing element coupled to said plate member; and wherein said biasing element biases said plate member toward the FIRST position.

3. The electrical switching apparatus assembly of claim 2 wherein said plate member comprises a first end portion and a second end portion disposed opposite and distal the first end portion; and wherein said maintaining member is coupled to the first end portion.

4. The electrical switching apparatus assembly of claim 3 wherein said biasing element is disposed between the first end portion and the second end portion.

5. The electrical switching apparatus assembly of claim 3 wherein the second end portion is pivotably coupled to said mounting member.

6. The electrical switching apparatus assembly of claim 2 wherein said mounting assembly further comprises a first wheel and a second wheel; wherein said mounting member is a wheel rail coupled to said first wheel and said second wheel and extending therebetween; wherein said biasing element is a spring structured to cause said maintaining assembly to move from the SECOND position to the FIRST position; and wherein said electrical switching apparatus is a medium voltage circuit breaker.

7. The electrical switching apparatus assembly of claim 1 wherein said maintaining member is a pin; and wherein said pin is disposed perpendicular to said plate member.

8. A switchgear system comprising:
a number of circuit stabs;
an enclosure having a number of compartments; and
an electrical switching apparatus assembly comprising:
an electrical switching apparatus comprising a number of terminals and a mounting assembly, each of said number of terminals being mechanically coupled and electrically connected to a corresponding one of said circuit stabs, said mounting assembly comprising a mounting member; and
a maintaining assembly comprising a plate member and a maintaining member, said plate member being coupled to said mounting member, said maintaining member being coupled to said plate member,
wherein, responsive to an arc fault event, said maintaining assembly is structured to move between a FIRST position and a SECOND position, and
wherein, when said maintaining assembly moves from the FIRST position toward the SECOND position, said maintaining member moves into engagement with one of said number of compartments in order to maintain said electrical switching apparatus assembly within said one of said number of compartments.

9. The switchgear system of claim 8 wherein said one of said number of compartments comprises a blocking component; wherein, when said maintaining assembly moves from the FIRST position to the SECOND position, said maintaining member moves with respect to the said blocking component; and wherein, when said maintaining assembly is in the SECOND position, said maintaining member engages said blocking component in order to maintain said electrical switching apparatus assembly within said one of said number of compartments.

10. The switchgear system of claim 9 wherein said blocking component has an edge portion defining a thru hole; wherein, when said maintaining assembly is in the SECOND position, said maintaining member engages the edge portion in order to maintain said electrical switching apparatus assembly within said one of said number of compartments.

11. The switchgear system of claim 10 wherein said maintaining member is a pin; wherein, when said maintaining assembly is in the FIRST position, said pin does not extend into the thru hole; and wherein, when said maintaining assembly is in the SECOND position, said pin extends through the thru hole.

12. The switchgear system of claim 8 wherein said maintaining assembly further comprises a biasing element coupled to said plate member; and wherein said biasing element biases said plate member toward the FIRST position.

13. The switchgear system of claim 12 wherein said plate member comprises a first end portion and a second end portion disposed opposite and distal the first end portion; and wherein said maintaining member is coupled to the first end portion.

14. The switchgear system of claim 13 wherein said biasing element is disposed between the first end portion and the second end portion.

15. The switchgear system of claim 13 wherein the second end portion is pivotably coupled to said mounting member.

16. The switchgear system of claim 12 wherein said mounting assembly further comprises a first wheel and a second wheel; wherein said mounting member is a wheel rail coupled to said first wheel and said second wheel and extending therebetween; wherein said biasing element is a spring structured to cause said maintaining assembly to move from the SECOND position to the FIRST position; wherein said maintaining member is a pin; wherein said pin is disposed perpendicular to said plate member; and wherein said electrical switching apparatus is a medium voltage circuit breaker.

17. A method of maintaining an electrical switching apparatus assembly within a switchgear system, said switchgear system comprising a number of circuit stabs and an enclosure having a number of compartments, said electrical switching apparatus assembly comprising an electrical switching apparatus and a maintaining assembly, said electrical switching apparatus comprising a number of terminals and a mounting assembly, said mounting assembly comprising a mounting member, said maintaining assembly comprising a plate member and a maintaining member, said plate member being coupled to said mounting member, said maintaining member being coupled to said plate member, the method comprising the steps of:
mechanically coupling and electrically connecting each of said terminals with a corresponding one of said circuit stabs; and
responsive to an arc fault event, moving said maintaining member into engagement with one of said number of compartments in order to maintain said electrical switching apparatus assembly within said one of said number of compartments.

18. The method of claim 17 wherein said one of said number of compartments comprises a blocking component; and wherein, responsive to the arc fault event, the method further comprises steps of:
moving said maintaining member with respect to said blocking component; and
mechanically engaging said maintaining member with said blocking component in order to maintain said electrical switching apparatus assembly within said one of said number of compartments.

19. The method of claim 18 wherein said blocking component has an edge portion defining a thru hole; and wherein, responsive to the arc fault event, the method further comprises the step of:

mechanically engaging said maintaining member with the edge portion in order to maintain said electrical switching apparatus assembly within said one of said number of compartments.

20. The method of claim 19 wherein said maintaining member is a pin; and wherein, responsive to the arc fault event, the method further comprises the step of:
moving said pin from a FIRST position corresponding to said pin not extending into the thru hole to a SECOND position corresponding to said pin extending through the thru hole.

* * * * *